United States Patent Office 3,467,623
Patented Sept. 16, 1969

3,467,623
SOLUBLE AROMATIC POLYAMIDES CONTAINING BRIDGED PARA-BIPHENYLENE LINKAGES
Helmuth E. Hinderer, Durham, N.C., and Ralph W. Smith, Gulf Breeze, Fla., assignors to Monsanto Company, St. Louis, Mo., a corporation of Delaware
No Drawing. Filed Nov. 8, 1966, Ser. No. 592,721
Int. Cl. C08g 20/20
U.S. Cl. 260—47          10 Claims

ABSTRACT OF THE DISCLOSURE

This invention relates to aromatic polyamides containing para-oriented biphenylene linkages. More particularly, the invention relates to soluble, flexible aromatic polyamides containing bridged para-biphenylene linkages.

BACKGROUND OF THE INVENTION

Wholly aromatic polyamides have become useful in a wide range of applications; particularly, those requiring high temperature resistance for prolonged periods of time. Those aromatic polyamides based on derivatives of biphenylene, such as 4,4'-diaminobiphenyl, have superior heat stability in comparison to polyamides based on meta-derivatives of benzene, but they are not appreciably soluble in such solvents as dimethylacetamide even with added inorganic salts. Also aromatic polyamides which contain para-oriented benzene rings, naphthalene ring structures and other multiple aromatic rings are characteristically almost totally insoluble. Solubility appears to decrease with the introduction of para-orientation and is further aggravated by naphthalene and other multiple ring systems.

Consequently, these more stable aromatic polyamides have not been successfully fabricated to useful articles such as fibers and films.

DESCRIPTION OF THE INVENTION

Accordingly, it is an object of the invention to provide partly and completely para-oriented aromatic polyamides which are soluble in the well known conventional aromatic polyamide solvents.

Another object is to provide soluble, flexible, thermally stable aromatic polyamides containing bridged para-biphenylene linkages.

An additional object is to provide fibers, filaments, films and other shaped articles from the polymers of the invention.

Yet another object is to provide processes for the preparation of certain of the monomers and the polymers of the invention.

Other objects and advantages of the invention will become apparent from the following description.

It has been found that the solubility of aromatic polyamides containing para-biphenylene linkages can be markedly improved if such para-biphenylene linkages contain bridging groups with or without substituent groups on the two phenylene rings. Thus, the aromatic polyamides of the invention contain bridged para-biphenylene linkages and are composed of the regularly recurring structural units of the general formula

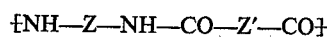

where Z and Z' are aromatic hydrocarbons of 6 to 15 carbon atoms or a bridged biphenylene radical of the formula

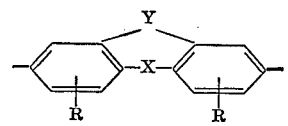

where X is a valence bond, or a suitable bridging group such as NHCO, $SO_2$, O, $CH_2$, or CO, Y is a bridging group such as NHCO, $SO_2$, O, $CH_2$, or CO and R is hydrogen or COOR' where R' is hydrogen or lower alkyl, provided that at least one bridged biphenylene radical is present in each recurring unit.

Representative polymers which are included within the above general formula are:

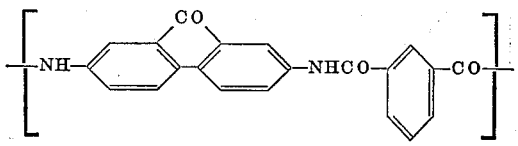

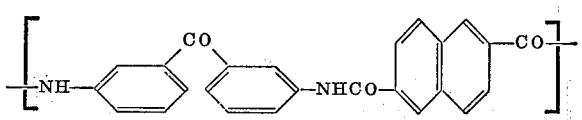

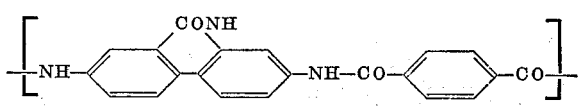

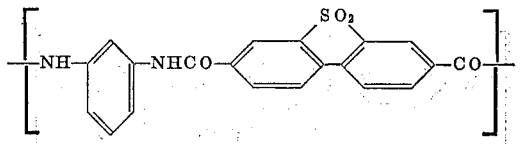

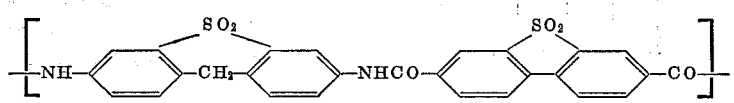

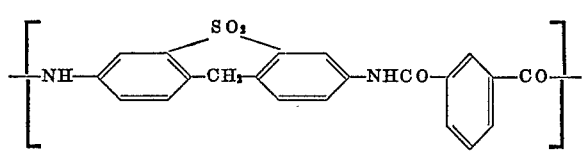
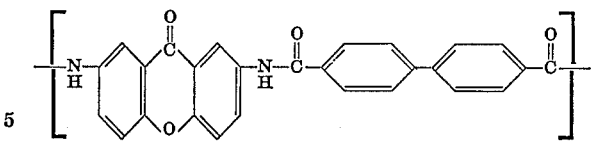
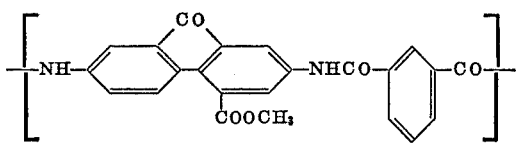
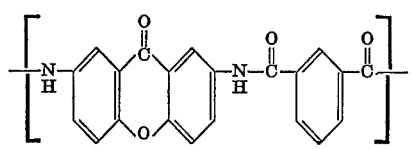
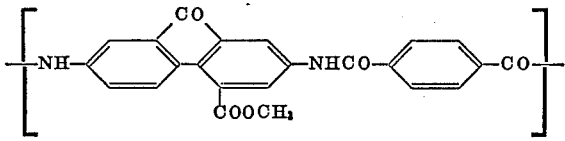
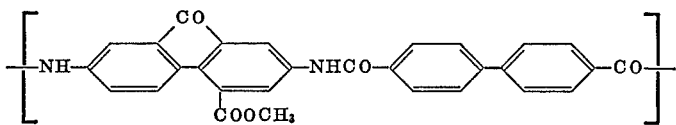
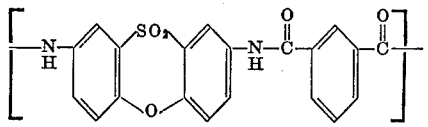
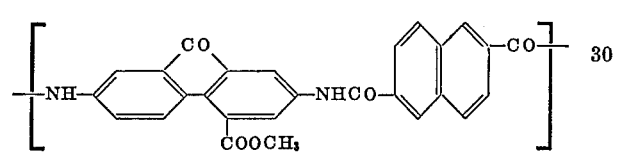
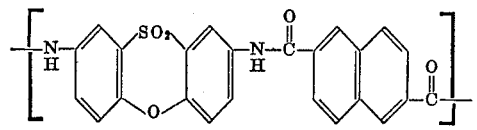
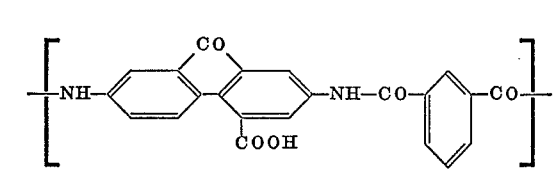
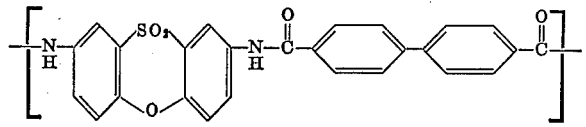
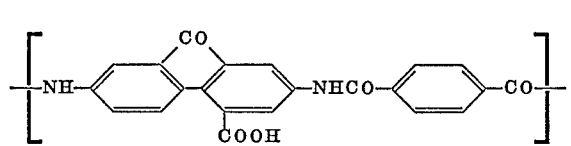
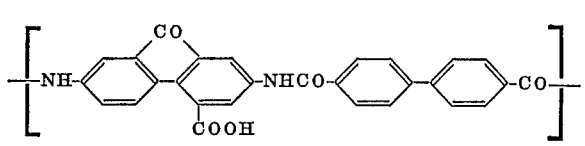
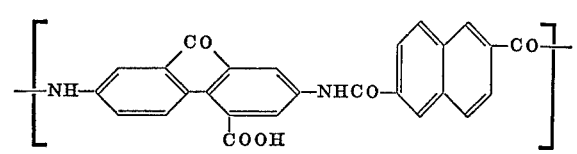
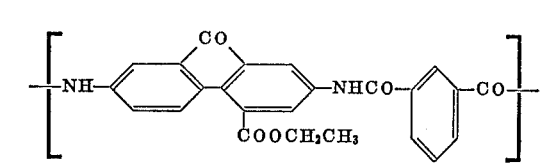

The soluble, high molecular weight polymers of this invention may be conveniently prepared in solution or interfacially by reacting an aromatic diacid chloride with an aromatic diamine, with at least one of the reactants containing a bridged biphenylene radical, the reaction taking place at temperatures below 100° C. and following the well known prior art procedures for the preparation of aromatic polyamides from aromatic diacid chlorides and aromatic diamines.

The aroamtic diamines which may be used include any and all of the well known single, multiple and fused ring diamines, such as m-phenylene diamine, p-phenylene diamine, 4,4'-diaminobiphenyl, 2,6-diaminonaphthalene, and others as disclosed in U.S. Patent 3,006,899. Those diamines of the invention which contain the solubility improving bridging groups and which are derivatives of 4,4'-diaminobiphenyl have the following general formula

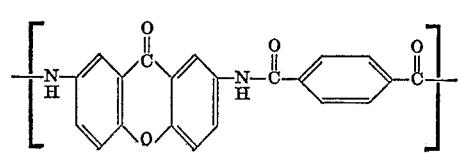
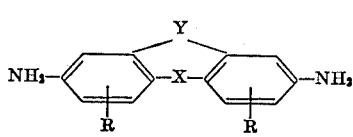

where Y is a "bridging" group between the 2,2'-position of the biphenyl ring and may be any group which does not interfere with the polymerization reaction. For good thermal stability the preferred bridging groups are those which are generally recognized as being stable units such as —O—, —CO—, —CH$_2$—, —CONH—, and SO$_2$. The group designated as X can be the same as Y and in addition X can be a valence bond. Each aromatic nucleus may contain a substituent to further improve solubility as indicated by R which may be hydrogen or —COOR′ where R′ is hydrogen or lower alkyl of 1 to 5 carbon atoms. The positioning of the substituent groups on each aromatic nucleus is limited only in that such groups cannot be attached to carbon atoms adjacent to the carbon atoms to which the amino or acid chain extending groups are attached. The amino groups may occupy any of the possible positions but the preferred orientation are on the 2,7- and 3,6-positions. Among such typical bridged diamines of the formula there may be mentioned for example: 3,7-thiaxanthene diamine-5,5-dioxide, 2,7-diaminofluorenone, 2,7-diaminophenanthridone, 2,7-diamino - 4 - carbomethoxyfluorenone, 2,7-diamino-4-carboxyfluorenone, and the like.

Suitable aromatic diacid chlorides includes all of the well known aromatic diacid chlorides such as terephthaloyl chloride, isophthaloyl chloride and others as disclosed, for example, in U.S. 3,006,899. The bridged aromatic diacid chlorides of the invention are those of the formula

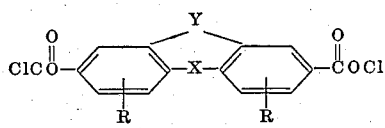

where X, Y and R have the significance previously indicated. Among such diacids there may be mentioned 4,4′-dibenzoyl chloride - 2,2′ - sulfone, 2,7-fluorenedicarboxylic acid, 9-fluorenone-2,7-carboxylic acid and the like.

The preparation of the bridged biphenylene diamines and diacid chlorides of the invention may follow well known reaction sequences. For example, 2,7-diamino-4-carboxy fluorenone may be prepared starting from diphenic acid as indicated schematically below:

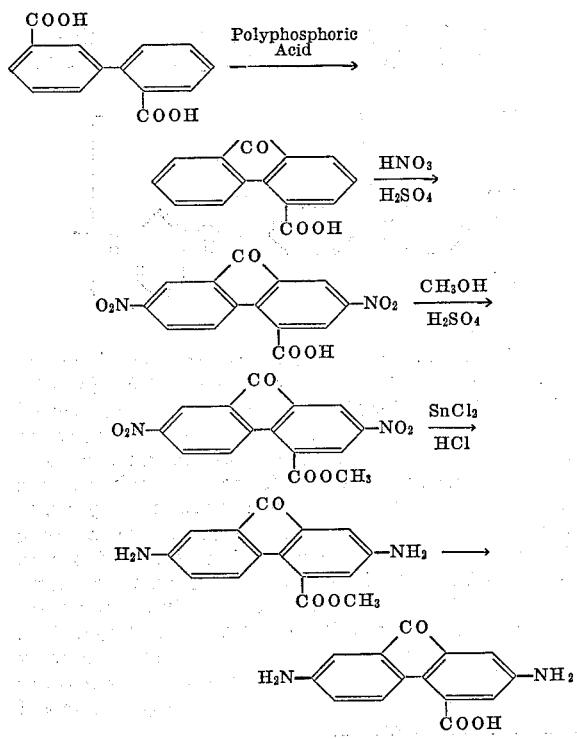

Other bridged diamines useful in the invention may be prepared by nitration of the bridged ring compound followed by subsequent reduction.

The diacid chlorides useful in this invention may be prepared by reaction of the corresponding acids with such reagents as phosphorous penta chloride and thionyl chloride. For example,

1

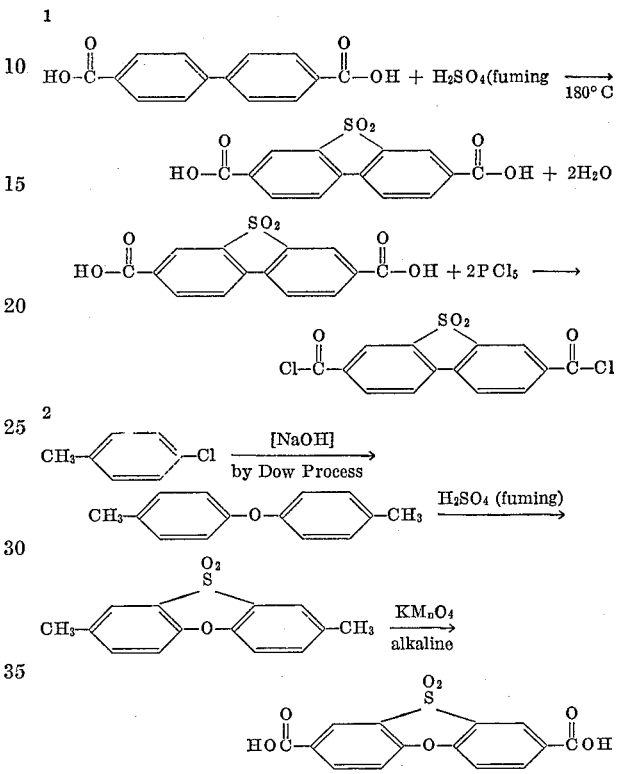

2

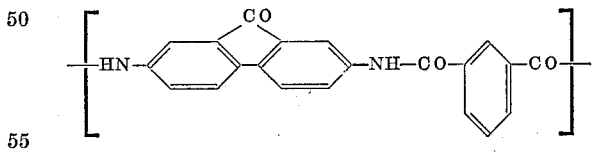

The invention is further illustrated by the following examples in which all parts and percents are by weight of total reactants unless otherwise indicated and all inherent viscosity measurements were obtained from 0.5 gram of polymer in 100 ml. of concentrated sulfuric acid at room temperature.

Example 1.—Preparation of poly 2,7-(fluorene) isothalamide

A 125 ml. 3-necked conical flask equipped with a nitrogen inlet tube, a stirrer and a drying tube was charged with 4.20 grams (0.20 mole) of 2,7-diaminofluorenone and 70 ml. of dimethylacetamide containing 5% lithium chloride. The solution was chilled in a nice water bath and then 4.06 grams (0.02 mole) of isophthaloyl chloride was added in one portion. The cooling bath was removed approximately 5 min. later and stirring continued at ambient temperatures for 2 hrs., then the solution was poured into water in a Waring Blendor. The polymer was slurried three times with water and dried in vacuo. A 6.8 gram portion of polymer was recovered which represented almost a 100% yield and had an inherent viscosity of 1.36. The material did not melt when heated in an open capillary tube to 500° C. and thermogravimetric analysis indicated excellent thermostability up to around 450° C. with only 2% of the initial weight having been lost at that temperature and significant weight loss beginning at around 470° C.

A dope was prepared from 1 gram of this polymer in 7 grams of dimethylacetamide containing 5% lithium chloride, and used to dry-cast a film at 100–125° C. which was subsequently soaked in water and dried in vacuo. The red film was slightly brittle but exhibited drawability at about 300° C. with some apparent increase in strength.

Example 2.—Preparation of poly 2,7-(fluorenone) 2,6-naphthalene dicarbonamide

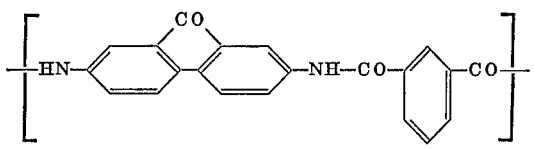

The procedure of Example I was followed to condense 4.2 grams (0.02 mole) of 2,7-diaminofluorenone in 72 ml. of dimethylacetamide containing 5% lithium chloride with 5.06 grams (0.02 mole) of 2,6-naphthalenedicarbonyl chloride. An orange-red precipitant appeared soon after the acid chloride was added. The mixture was stirred at ambient temperatures for 1 hr., then at 50–60° C. for 1 hr. There was then added 0.48 gram of lithium hydroxide and after stirring an additional half hour the mixture was poured into water in a Waring Blendor. The resulting solid was slurried twice with 300 ml. of water at room temperature then twice with hot water and finally with methanol. The vacuum dried orange-red polymer, weighed 7 grams (89.8% yield) and had an inherent viscosity of 3.19. The TGA thermogram indicated that significant loss in weight did not begin until 500° C. had been reached.

Example 3.—Preparation of poly 2,7-(phenanthridone) isophthalamide

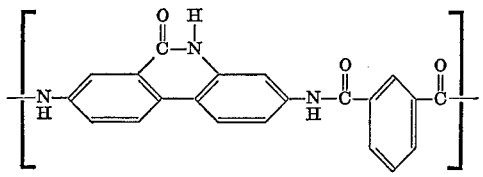

The condensation of 4.5 grams of 2,7-diaminophenanthridone in 60 ml. of dimethylacetamide containing 5% lithium chloride, with 4.06 grams of isophthaloyl chloride was conducted following the procedure in Example 1. The brown reaction dope was stirred for 1 hr. at room temperature and then was heated briefly at 50–60° C. to dissolve a small amount of precipitate. The reaction was allowed to proceed for about ¾ hr. at room temperature, then the polymer was precipitated into water, stirred and slurried with cold and hot water, then dried in vacuo. A 6 gram yield representing 84.5% yield of purplish-grey powder with an inherent viscosity of 0.84 was obtained. The polymer did not melt when heated in an open capillary to 500° C., and according to TGA, it had excellent heat stability up to about 500° C. with only 3% loss in weight at that temperature. A drawable film was cast using a dope of 1 gram polymer in 5.5 ml. of dimethylacetamide containing 5% lithium chloride.

Example 4.—Preparation of poly 2,7-(phenanthridone) terephthalamide

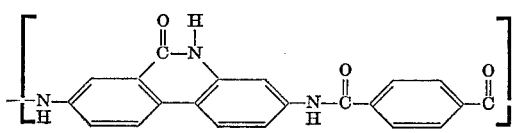

This polymerization was conducted in a 200 ml. flask following the description of Example 1 and using 3.37 grams (0.015 mole) of 2,7-diaminophenanthridone in 54 ml. of dimethylacetamide containing 5% lithium chloride and 3.05 grams (0.015 mole) of terephthaloyl chloride. A precipitate appeared and an additional 50 ml. of solvent and heating in a boiling water bath for 1 hr. failed to dissolve the solid. The mixture was poured into a blendor and the solid handled in the usual manner. The yield was 5.0 grams (94.0% yield) of greenish-brown polymer having an inherent viscosity of 1.90. The polymer did not melt by 500° C., and a TGA thermogram indicated excellent stability to that temperature with approximately a 4% weight loss by 500° C.

Example 5.—Preparation of 4,4'-dicarboxybiphenyl-2,2'-sulfone

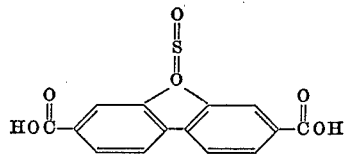

This example gives the preparation of 4,4'-dicarboxybiphenyl-2,2'-sulfone and its conversion to the corresponding diacid chloride.

The preparation was carried out by treating 20 grams of 4,4'-dicarboxybiphenyl with 188 grams of 15% fuming sulfuric acid for 2 hrs. at 180° C. The reaction product was then cooled by its addition to 500 cc. of chipped ice. A yellow flocculent product separated and to this mixture was added 50 grams of potassium bicarbonate. The mixture was filtered to remove the crude product and then purified by dissolved in acetone, treated with activated charcoal and recrystallized by cooling. The purified product was isolated by filtration. The dried acid product was converted to its acid chloride by refluxing with 1.5 times the stoichmetric quantity of phosphrous pentachloride in toluene for several hours. Unreacted diacid and excess phosphorus pentachloride were removed by filtering the hot mixture. To the filtrate was added hexane which precipitated the diacid chloride. The diacid chloride had a melting point of 210–214° C.

Example 6.—Preparation of polyamide from 4,4'-bibenzoylchloride-2,2'-sulfone and m-phenylene diamine

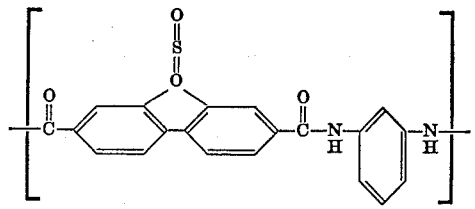

In this example a polyamide was prepared from the diacid chloride of Example 5, 4,4'-bibenzoylchloride-2,2'-sulfone and meta-phenylene diamine. Into a three-necked 200 ml. flask was placed 2.16 grams of meta-phenylene diamine and 40 ml. of dried dimethylacetamide containing 5% dissolved lithium chloride. The mixture was stirred under a nitrogen blanket and protected by a drying tube until solution was completed. To the resulting solution cooled in an ice water bath was added 6.86 grams (0.02 mole) of 4,4'-di(chlorocarbonyl) diphenyl-2,2'-sulfone. The clear yellow viscous solution which resulted was then stirred for about an hour longer. The polymer was isolated by coagulation, washed throroughly and dried. A near quantitative yield of a yellow polymer was obtained which had an inherent viscosity of 0.38 and did not melt below 490° C.

Example 7.—Preparation of polyamide from 4,4'-bibenzoylchrloride-2,2'-sulfone and 3,7-thiaxanthene diamine-5,5-dioxide

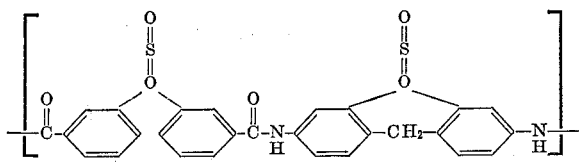

A solution polymerization procedure similar to that of Example 6 was used to polymerize 6.86 grams (0.02 mole) of 4,4'-bibenzoyl chloride-2,2'-sulfone and 5.20 g. (0.02 mole) grams of 3,7-thiaxanthene diamine-5,5-dioxide. An additional 35 ml. mimethylacetamide was added to insure complete solution and a hot water bath was used to surround the reaction vessel insuring complete reaction. The resulting polymer was isolated by coagulation, washed thoroughly and dried, yielding 10.4 grams which is 92.7% of theory. Inherent viscosity was 0.46 and the polymer did not melt below 490° C.

Example 8.—Preparation of polyamide from isophathaloyl chloride and 3,7-thiaxanthene diamine-5,5-dioxide

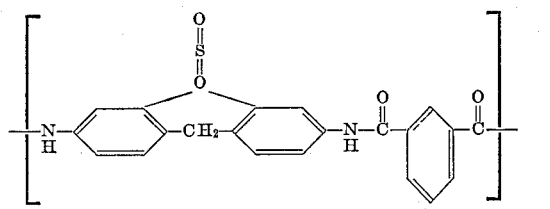

Into a 125 ml. flask equipped with a nitrogen inlet tube, a stirrer and a drying tube was placed 5.2 grams (0.02 mole) of 3,7-thiaxanthene diamine-5,5-dioxide, 42.0 ml. of dimethylacetamide containing 5% lithium chloride and the mixture stirred until solution was complete. Then 4.06 grams (0.02 mole) of isophthaloyl chloride was added as a solid. The resulting yellow solution was cooled with ice and water during the exothermic period of the reaction and then allowed to warm at room temperature during temperature 2–3 hrs. of additional stirring. A sample was taken from the yellow polymeric solution and a film was cast and dried into an oven at 90° C. The remainder of the solution was coagulated and the resulting polymer washed and dried. Inherent viscosity of the polymer was 0.73. Differential thermal analysis showed no melting for the polymer below 500° C. and thermogravimetric analysis indicated no severe weight loss below 450° C. The film sample was cut in strips and drawn over a hot pin at temperatures of from 235–295° C. Drawing two times its original length at 295° C. gave a tough high-tensile strength film. The drawn film was quite flexible and would withstand several creasings without rupture.

Example 9.—Preparation of 2,7-dinitrofluorenone-4-carboxylic acid

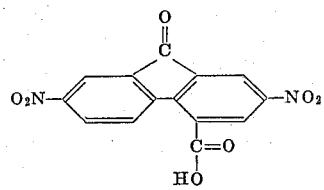

The momomeric flurorenone carboxylic acid was prepared by heating diphenic acid with polyphosphoric acid essentially as described, by Weisberger et al. in J. Org. Chem., 20, 1396 (1955). Nitration of fluorenone-4-carboyxlic acid was then conducted as follows.

To a stirred solution of 1.2 liter of fuming nitric acid (specific gravity 1.52) and 100 ml. of concentrated sulfuric acid was added in portions 342 grams (1.53 mole) of fluorenone-4-carboxylic acid during one-half hour. When the temperature reached 70° C. as the result of the exothermic behavior, external cooling was applied as required to keep the temperature at 65–70° C. during the addition. The resulting red-brown solution was heated on a steam bath for 7 hrs. at 90–94° C. then chilled and filtered. After recrystallization twice from glacial acetic acid, a 270.4 gram yield, 56.2% yield of vacuum dried canary yellow semi-crystalline material was obtained melting at 239–240° C. The elemental analysis given below and the infrared spectrum was consistent with the proposed structure.

*Analysis.*—Calculated for $C_{14}H_6N_2O_7$: C, 53.51; H, 1.92; N, 8.92. Found: C, 53.88; H, 2.28; N, 8.82.

Example 10.—Preparation of 2,7-dinitro-4-carbomethoxyfluorenone

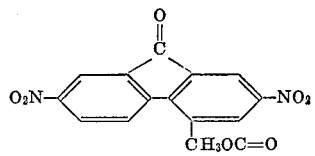

A stirred mixture of 154 grams (0.49 mole) of 2,7-dinitrofluorenone-4-carboxylic acid, 3 liters of methanol, 25 ml. of dimenthylsulfate, and 200 ml. of concentrated sulfuric acid was refluxed for 17 hours. The product was collected from the cooled mixture, washed with 5% sodium carbonate solution and recrystallized from 3.5 ml. of glacial acetic acid. The yield of product was 132 grams, 82% of theory, and the melting point was 194.5 to 196° C. The elemental analysis for this compound and infrared spectrum are consistent with the desired structure.

*Analysis.*—Calculated for $C_{15}H_8N_2O_7$: C, 54.89; H, 2.46; N, 8.54. Found: C, 54.78; H, 2.56; N, 8.52.

Example 11.—Preparation of 2,7-diamino-4-carbomethoxyfluorenone

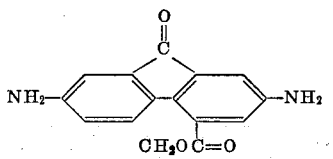

A stirred solution of 450 grams (2.0 mole) of stannous chloride dihydrate in 800 ml. of concentrated hydrochloric acid and 800 ml. methanol were heated to 80° C. Heating was stopped and 66 grams (0.2 mole) of 2,7-dinitro-4-carbomethoxyfluorenone was added portionwise during 25 minutes. After refluxing for 2½ hours, the mixture was chilled and filtered. The orange-brown solid was then mixed with 1 liter of water and 900 ml. of 10% potassium hydroxide to free the diamine. The resultant green pasty material was slurried with water then mixed with 600 ml. of 1 N HCl and a small amount of undissolved material was filtered off. To the dark red-brown opaque solution was added 200 ml. of dilute $NH_4OH$ in a 1:1 ratio to reprecipitate the diamine which was slurried several times with water and dried in vacuo at about 70° C. The dark green amorphous material weighed 31.9 grams, a 59.2% yield, and melted with decomposition. The melting point varied with the rate of heating, values of 203.5° C. and 209.5° C. were observed. This compound had the following analysis consistent with the theoretical structure:

Analysis.—Calculated for $C_{15}H_{12}N_2O_3$: C, 67.15; H, 4.51; N, 10.44. Found: C, 66.65; H, 4.70; N, 10.46.

Example 12.—Preparation of 2,7-diamino-4-carbethoxyfluorenone

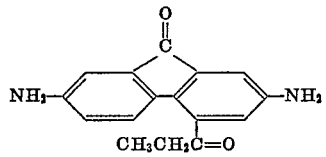

To a stirred solution of 1,125 grams (5.0 mole) of stannous chloride dihydrate, 1,700 ml. of concentrated hydrochloric and 500 ml. of acetic acid heated to 70° C., was added 158 grams (0.5 mole) of 2,7-dinitro-4-carboxyfluorenone during ¾ of an hour. The temperature was kept to 95–100° C. by regulating the rate of addition. The resultant heterogenous mixture was refluxed for at least 6 hrs., chilled and filtered. The solid was mixed with 2 l. of anhydrous ethanol containing 250 ml. of concentrated sulfuric acid and then refluxed for 60 hrs. A precipitate had appeared in what was initially a red-purple solution. To the mixture was added 300 ml. of dry benzene, 1 liter of solvent was distilled off and the residual mixture chilled and filtered. The pale-orange solid was mixed with 1.5 liter of water and treated with 300 ml. of 20% sodium hydroxide solution to liberate the diamine which was then washed with water. Further, purification was effected by mixing the solution and 1 liter of water and 400 ml. of 1 N hydrochloric acid removing a small amount of undissolved material and reprecipitating by adding 200 ml. of dilute ammonium hydroxide. The green pasty product was washed with dilute ammonium hydroxide solution, then with water and dried in vacuo. The resulting product was obtained in a 68.1 gram yield, 48.3% based on the dinitro compound, and melted with decomposition at 179° C. with initial softening at 173° C.

Example 13.—Preparation of 2,7-diamino-4-carboxyfluorenone

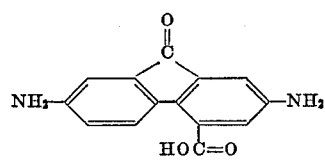

56.0 grams of 2,7-diamino-4-carbethoxyfluorenone was refluxed for 2½ days in a mixture of 400 ml. of water and 200 ml. of concentrated sulfuric acid. The solid collected from the chilled reaction mixture was combined with 1 liter of water and 230 ml. of 5 N ammonium hydroxide. After further purification, the resultant material was washed with water and dried in vacuo at about 80° C. There was obtained 38.5 grams, 77% yield of light purple amorphous powder which did not melt when heated to 450° C.

The analysis for this compound is a follows:

Analysis.—Calculated for $C_{14}H_{10}N_2O_3$: C, 66.13; H, 3.96; N, 11.02. Found: C, 64.62; H, 4.56; N, 10.80.

The infrared spectrum of this compound is consistent with the proposed structure. This diamine was also prepared by acid hydrolysis of the corresponding methyl ester derivative.

Example 14.—Preparation of poly 2,7-(4-carbomethoxyfluorenone)isophthalamide

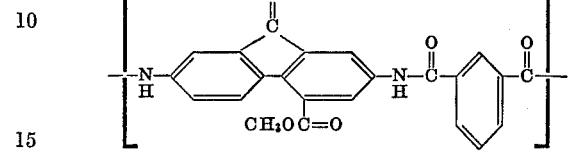

A 200 ml. flask was equipped with a gas inlet tube for nitrogen, sirrer and drying tube. To the flask was added a mixture of 2.68 grams (0.01 mole) of 2,7-diamino-4-carbomethoxyfluorenone and 35 ml. of dimethylacetamide, followed by stirring for ½ hr. Isophthaloyl chloride in a 2.3 gram portion was added all at once. The cooling bath was then removed after about 5 min. and the dope was stirred at ambient temperature for 2 hrs. To precipitate the polymer the dope was poured into a solution of 200 ml. of water and 100 ml. of dimethylacetamide rapidly stirred in a Waring blendor. The product was washed and dried and there was obtained 3.5 grams, 88% yield, of brown-red material having an inherent viscosity of 1.05. The polymer did not melt when heated up to 450° C. and thermogravimetric analysis in nitrogen indicated good weight retention up to 400° C. with only a 3.4% loss at that temperature. A dope was prepared by heating 1 gram of this polymer with 9.5 ml. of dimethylacetamide containing 5 grams of lithium chloride in a water bath at 90° C. A film prepared from this dope and dried was transparent, strong, flexible, and exhibited drawability at elevated temperatures of up to 300° C.

Example 15.—Preparation of poly 2,7-(4-carbomethoxyfluorenone)terephthalamide

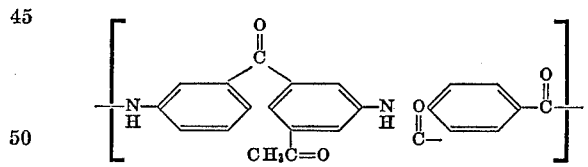

This polymerization reaction was conducted in a manner similar to that of Example 14, using 2.68 grams of 2,7-diamino-4-carbomethoxy-fluorenone in 30 ml. of dimethylacetamide containing 5% lithium chloride and 20.3 grams of terephthaloyl chloride. A very viscous dope developed and 20 ml. more solvent was added. The reaction was allowed to proceed for 2½ hrs. at room temperature. A small portion of the dope was cast into a film and the main portion was diluted with 30 ml. of dimethylacetamide and poured into a solution of 150 ml. of dimethylacetamide and water. After further washing and drying, the resulting material weighed 3.5 grams and the film weighed 0.3 gram for a total yield of 3.8 grams representing 95% of the theoretical. The inherent viscosity of this polymer was 2.47 and the polymer did not melt when heated to 450° C. The film as cast was slightly orange-brown, transparent, strong and slightly flexible at 315° C. Rudimentary filaments were obtained from this polymer using a solution of 0.5 gram of polymer in 6.5 ml. of dimethylacetamide containing 5% lithium chloride extruded into water. The filamentary samples were strong, flexible and possessed slight drawability in a range from 300–350° C.

Example 16.—Preparation of poly 2,7-(4-carbomethoxyfluorenone)bibenzamide

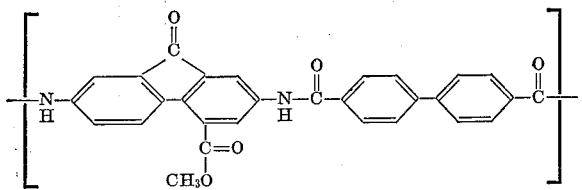

Following the procedure of Example 14, 2.68 grams (0.01 mole) of 2,7-diamino-4-carbomethoxyfluorenone in 60 ml. of dimethylacetamide containing 5% lithium chloride was treated with 2.79 grams (0.01 mole) of bibenzoyl chloride. The reaction mixture became very viscous and was diluted with 50 ml. of solvent. After 2 hrs. the dope was further diluted with an additional 50 ml. of solvent just before precipitating the polymer into water. The polymer was washed and dried and the orange-brown product weighed 4.7 grams (representing a 99.2% yield) and had an inherent viscosity of 1.60. A spinning dope of 2 grams of this polymer in 28 ml. of dimethylacetamide containing 5% lithium chloride was used to cast films which were orange-brown in color, strong, flexible and hot drawable at 380° C. The above dope was also used to prepare filaments using a 5% dimethylacetamide in water solution as coagulant.

Example 17.—Preparation of poly 2,7-(4-carbomethoxyfluorenone)2,6-naphthalenedicarbonamide

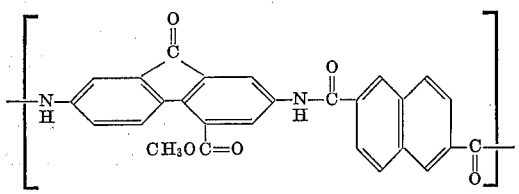

This polymerization was conducted using 2.68 grams (0.019 mole) of 2,7-diamino-4-carbomethoxyfluorenone in 40 ml. of dimethylacetamide containing 5% lithium chloride and 2.53 grams of 2,6-naphthalene dicarbonyl chloride. A very viscous reaction dope was obtained and an additional 25 ml. of solvent was employed. After two hours the polymers was precipitated, washed and dried. The yield of fluffy red-brown fibrous material was 4.5 grams and it had an inherent viscosity of 2.96. Thermogravimetric analysis in nitrogen indicated that only 5.2% of the original weight of the polymer had been lost by 400° C. Orange-brown transparent, strong, flexible films were cast from a dope containing 1 gram of this polymer and 14 ml. of dimethylacetamide containing 5% lithium chloride and 2 gms. of the dope was uesd to spin filaments having good strength, flexibility, and slight drawability at 380° C.

Example 18.—Preparation of poly 2,7-(4-carboxyfluorenone)isophthalamide

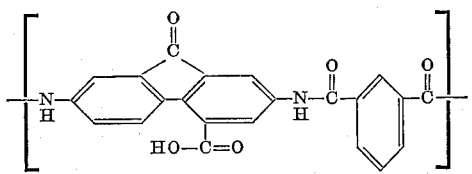

To a solution of 2.54 grams (0.01 mole) of 2,7-diamino-4-carboxyfluorenone and 25 ml. of dimethylacetamide were added 2.03 grams (0.01 mole) of isophthaloyl chloride under the conditions of Example 14. The reaction was allowed to proceed for 2 hrs. then the dope was worked up in the usual manner. There was obtained 3.7 grams of brown-fluffly material representing a 96.5% yield and the polymer had an inherent viscosity of 1.27. Films were prepared from this polymer also and a film strip drawn at 425° C. was found to have a zero strength temperature of 486° C. TGA thermogram indicated that a slow loss in weight occurred between 340–450° C. followed by a more rapid loss above 450° C. This behavior suggests that decarboxylation preceded the polymer degradation. The filaments obtained as per Example 15 had fair strength and could be drawn 1.6–1.9 times at 380° C.

Example 19.—Preparation of poly 2,7-(4-carboxyfluorenone)terephthalamide

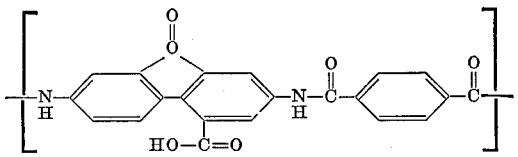

Following the procedure of Example 14 polymer was prepared using 2.54 grams of 2,7-diamino-4-carboxylfluorenone in 30 ml. of dimethylacetamide and 2.03 grams of terephthaloyl chloride. The stirring was continued for 4 hrs. and the resulting transparent red-orange dope was diluted with an additional 30 ml. of solvent and the polymer then coagulated, washed and dried. There was obtained 3.5 grams, a 92.2% yield, of a brown-red fluffly polymeric material having an inherent viscosity of 3.27. The polymer did not melt when heated to 400–450° C. and a TGA thermogram indicated that loss of weight began at a moderate rate at 320° C. probably due mainly to decarboxylation and a more rapid loss in weight took place above 450° C. The polymer had retained approximately 95% of its original weight at 350° C. and 84% at 450° C. Strong, flexible films were cast which were drawable in the range of 380–425° C. The hot stretched films were opaque and less flexible suggesting that a high degree of crystallinity had developed. A piece of film drawn at 425° C. was found to exhibit a zero strength temperature of 525° C. Two grams of this polymer dope was diluted with 0.5 ml. of solvent and used to spin filaments as per Example 15.

Example 20.—Preparation of poly 2,7-(4-carboxyfluorenone)bibenzamide

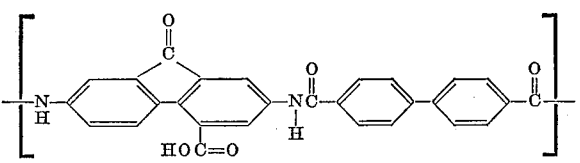

To a chilled solution of 2.54 grams of 2,7-diamino-4-carboxyfluorenone in 60 ml. of dimethylacetamide was added 2.79 grams of bibenzoyl chloride. The reaction was allowed to proceed with stirring for 3½ hrs. and the resulting polymer then isolated, washed and dried. The yield of reddish-brown, fluffy, fibrous material was 4.5 grams, 97.7% yield, and the polymer had an inherent viscosity of 2.25. Thermogravimetric analysis in nitrogen indicated that a relatively slow weight loss began at around 320° C., due mainly to decarboxylation and a more drastic weight loss above 460° C. The loss in weight was 3% at 350° C. and 13% at 450° C. Films were prepared as described in Example 14 using a solution of 1 gram of polymer and 12 ml. of dimethylacetamide containing 5% lithium chloride. The film was transparent, brown-orange in color, strong, flexible and could be drawn over a hot pin at 380° C. Filaments were also prepared as per Example 15 with a solution of 2 grams of polymer dope diluted with 1 ml. of solvent and using both water and a 5% dimethylacetamide water solution as coagulants.

Example 21.—Preparation of poly 2,7-(4-carboxyfluorenone)2,6-naphthalene dicarbonamide

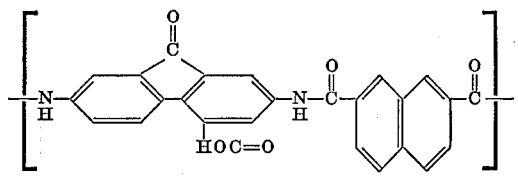

The procedure of Example 14 was followed to polymerize 2.54 grams of 2,7-diamino-4-dicarboxyfluorenone dissolved in 40 ml. of dimethylacetamide containing 5% lithium chloride with 2.53 grams of 2,6-naphthalene dicarbonyl chloride. The resulting polymer was obtained in a 4.0 gram amount representing a 93.0% yield and the polymer had an inherent viscosity of 2.57. The TGA thermogram in nitrogen indicated that loss in weight began around 320° C. with the weight loss relatively slow up to about 450° C. above which it became more rapid. Only 3% of the original weight loss had occurred by 350° C. and the weight loss was 12% at 450° C. and 14% at 500° C. Films were prepared in the usual manner and also filaments.

Example 22.—Preparation of poly 2,7-(4-carboethoxyfluorenone)isophthalamide

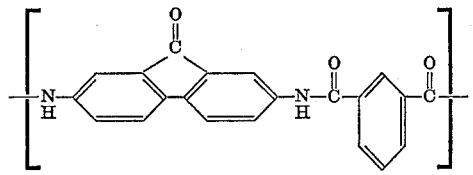

This polymerization involved the interaction of a solution of 2.83 grams of 2,7-diamino-4-carbethoxyfluorenone in 35 ml. of dimethylacetamide with 2.03 grams of isophthaloyl chloride. A very viscous, almost gell-like mixture, resulted and the dope was diluted in 35 ml. of dimethylacetamide. After stirring at room temperature for 2 hrs. more dimethylacetamide was added and the polymer was precipitated by pouring the dope into a solution of 150 ml. each of water and dimethylacetamide. There was obtained 3.9 grams of fluffy orange material which had an inherent viscosity of 2.17. The polymer did not melt up to 480° C.

The two diamines (2,7-diaminoxanthenone and 2,8-diaminophenoxathiin-10-dioxide) used in the remaining examples are known compounds and were prepared by methods described in the literature.

2,7-diaminoxanthenone was prepared using the method described by A. A. Goldberg and H. A. Walker (J. Chem. Soc., 1953, 1348). The method involved the nitration of xanthenone, separation of the desired isomer and subsequent reduction with stannous chloride.

The synthesis of 2,8-diaminophenoxathiin-10-dioxide was conducted according to the procedure described by Nobis et al. in J. Am. Chem. Soc., 75, 3384 (1954). The three step sequence, starting with the commercially available phenoxathiin, involved oxidation (with peroxide) to the phenoxathiin-10-dioxide, nitration and then reduction with stannous chloride.

Example 23.—Preparation of poly 2,7-(xanthenone) isophthalamide

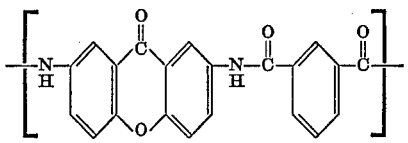

A 200 ml. conical flask equipped with a gas inlet tube for nitrogen mechanical stirrer, and drying tube was charged with 4.52 gms. (0.02 mole) of 2,7-diaminoxanthenone and 60 ml. of dimethylacetamide containing 5% lithium chloride. The yellow solution was chilled in an ice bath and then 4.06 gms. (0.02 mole) of isophthaloyl chloride was added in one portion. The cooling bath was then removed after about 5 min., and stirring was continued at ambient temperature for 3¾ hrs. The yellow, transparent dope was filuted with 30 ml. of dimethylacetamide and the polymer precipitated by pouring into a solution of 200 ml. each of water and dimethylacetamide, rapidly stirred in a Waring Blendor. The product was washed three times with 300 ml. of hot water in the Blendor. The product was then washed with methanol and dried in vacuo. There was obtained 6.6 grams (93% yield) of buff colored material having an inherent viscosity of 1.35. The polymer did not melt when heated to 450° C.

Thermogravimetric analysis (TGA) indicated excellent thermal stability up to 450° C. with only a 2% loss at that temperature. Significant weight loss began around 470° C.

A dope was prepared from 1 gram of polymer in 9.5 ml. of dimethylacetamide containing 5% lithium chloride. A film was cast at 100° C. which was subsequently soaked in water and dried vacuo. The yellow film was tarnsparent, strong and flexible and could be drawn about 4 times over a ceramic tube at 330° C. with apparent gain in strength. The drawn film was opaque (suggesting a high degree of crystallinity) and exhibited a zero strength temperature of 505° C.

Strong flexible filaments were obtained by extruding the dope from a hypodermic syringe into a 5% dimethylacetamide-water solution.

Example 24.—Preparation of poly 2,7-(xanthenone) terephthalamide

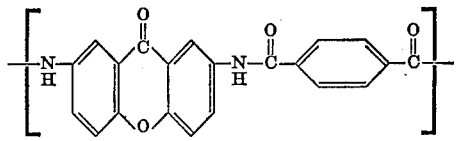

The procedure described in Example 23 was followed to effect the reaction between 4.52 grams of 2,7-diaminoxanthenone in 60 ml. of dimethylacetamide containing 5% lithium chloride with 4.06 grams of terephthaloyl chloride. Approximately 5 ml. of solvent was used to rinse the acid chloride down the sides of the flask. After stirring for 1 hour at ambient temperature there was added another 10 ml. of solvent to render the viscous dope more fluid. One hour later, 1.7 grams of lithium hydroxide was added, the mixture stirred for ½ hour and the polymer was then precipitated in the following manner. The dope was diluted with 100 ml. of dimethylacetetamide, placed in a Waring Blendor, and water added in small portions until a volume of approximately 800 ml. was attained. The finely divided material was slurried in the Blendor with 400 ml. of water, three times with 400 ml. of hot water, soaked in methanol and dried in vacuo. The yield was 7.0 grams (98.6%) of light brown material, having an inherent viscosity of 2.03. A TGA thermogram indicated excellent thermal stability up to 500° C. at which temperature 93% of the original weight had been retained.

A dope was prepared by dissolving 1 gram of polymer in 16 ml. of warm dimethylacetamide containing 5% lithium chloride. Filaments were extruded from the dope as described in the preceding example.

Example 25.—Preparation of poly 2,7-(xanthenone) bibenzamide

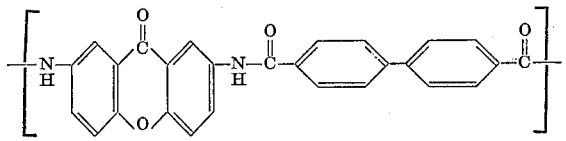

The apparatus and procedure described in Example 23 was used for the condensation of 4.52 grams (0.020 mole) of 2,7-diaminoxanthenone in 75 ml. of 5% lithium chloride in dimethylacetamide with 5.58 grams (0.020 mole) of bibenzoyl chloride. The ice water bath was removed 5 minutes after the acid chloride had been added, and the reaction was allowed to proceed for 2 hours at ambient temperature. The slightly turbid, viscous dope was diluted with 40 ml. of solvent, stirred for ½ hour at room temperature, and then ½ hour at 60–80° C. After the mixture had cooled, it was diluted with 50 ml. of dimethylacetamide and the polymer precipitated by pouring into 40 ml. of water in a Blendor. The product was slurried three times with 300 ml. of water, and three times with 300 ml. of hot water in the Blendor. After soaking in methanol and drying in vacuo, the fluffy, light brown material weighed 8.0 grams (93% yield) and had an an inherent viscosity of 1.63.

Example 26.—Preparation of poly 2,7-(xanthenone) 2,6-naphthalene dicarbonamide

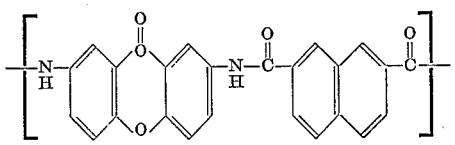

The apparatus and procedure described in Example 23 was employed for the reaction of a chilled solution of 4.52 grams (0.020 mole) of 2,7-diaminoxanthenone in 70 ml. of 5% lithium chloride in dimethylacetamide with 5.06 (0.020 mole) of 2,6-naphthalene dicarbonyl chloride. The mixture became very viscous within a few minutes after the addition of the acid chloride. The mixture was diluted with 15 ml. of solvent, and the reaction allowed to proceed for 2 hours at ambient temperature. Then 1.6 grams of dried lithium hydroxide and 50 ml. of dimethylacetamide was added and the stirring continued for three hours. The polymer was precipitated by diluting the dope with 150 ml. of dimethylacetamide in a Waring Blendor and adding about 500 ml. of water in small portions. The finely divided material was slurried three times with 400 ml. of hot water, soaked in methanol overnight and dried in vacuo. The yield of light brown product was 6.9 grams (85.7%) and had an inherent viscosity of 2.60.

A TGA thermogram in nitrogen indicated excellent thermal stability up to 500° C. at which temperature the material had lost only 4.8% of its original weight.

Example 27.—Preparation of poly 2,8-(phenoxathiin-10-dioxide)isophthalamide

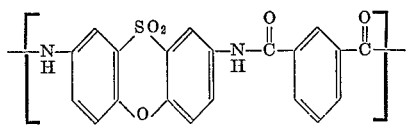

To a chilled solution of 5.24 grams (0.02 mole) of 2,8-diaminophenoxathiin-10-dioxide in 45 ml. of dimethylacetamide containing 5% lithium chloride was added 4.06 grams (0.02 mole) of isophthaloyl chloride in one portion. The solution changed from orange to light yellow. After 5 minutes, the ice water bath was removed. The dope was stirred at room temperature for 2 hours, 0.72 gram of dry lithium hydroxide along with 5 ml. of solvent were added, and stirring was continued for 2 hours. Film was cast from a small portion of the dope and dried at 85° C. The slightly opaque film was strong and flexible. The remainder of the dope was diluted with 45 ml. of dimethylacetamide and the polymer precipitated by pouring into water in a Waring Blendor. The precipitated polymer was washed with water, methanol, and dried in vacuo. The yield of white, fluffy material was 7.0 grams and the inherent viscosity was 1.15.

Colorless, strong, flexible films were also prepared from a dope obtained by dissolving 3 grams of polymer in 17 ml. of dimethylacetamide containing 5% lithium chloride. A strip of this film could be drawn 2.8 times over a ceramic tube at 300° C. with apparent gain in strength. The drawn film was opaque suggesting that a high degree of crystallinity had developed.

The bulk polymer exhibited very good thermal stability. A TGA thermogram in nitrogen indicated a 97.9% weight retention at 400° C. and a 92.4% weight retention at 450° C.

Example 28.—Preparation of poly 2,8-phenoxathiin-10-dioxide-terephthalamide

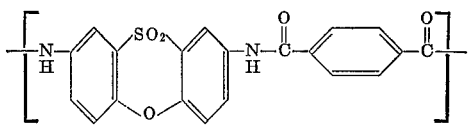

To a chilled solution of 2.62 grams (0.010 mole) of the diamine in 35 ml. of dimethylacetamide containing 5% lithium chloride was added 2.03 grams (0.010 mole) of terephthaloyl chloride. The resulting solution changed from yellow-orange to bright yellow. The reaction was allowed to proceed for 3 hours at ambient temperature, 0.46 gram of dried lithium hydroxide was added, and stirring continued for an additional 2 hours. A small portion of the dope was cast into films (which were dried at 100° C., soaked in water, and then dried in vacuo). The remainder of the dope was diluted with 25 ml. of dimethylacetamide and the polymer precipitated by pouring into 300 ml. of water in a Waring Blendor. The polymer was washed with water, methanol and then dried in vacuo. The bulk polymer was white, weighed 3.0 grams and had an inherent viscosity of 1.33.

The strong flexible, slightly opaque film was hot drawable with apparent gain in strength. The film was drawn 1.8 times over a ceramic tube at 350° C. and remained clear.

The thermal stability of the polymer was very good as judged by a TGA thermogram (in nitrogen) which indicated a 98.0% weight retention at 400° C. and a 90.9% weight retention at 500° C.

Example 29.—Preparation of poly 2,8-(phenoxathiin-10-dioxide)bibenzamide

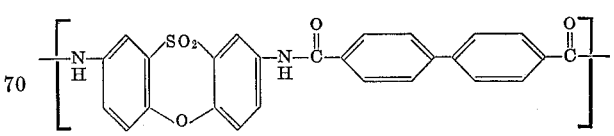

The polymerization was conducted in the usual manner, as described in the preceeding example, using 2.62 grams (0.010 mole) of 2,8-diamino-phenoxathiin-10-dioxide, 50 ml. of 95% dimethylacetamide, 5% lithium chloride and 2.79 grams (0.010 mole) of bibenzoyl chloride. Lithium hydroxide (0.46 grams) was added 3 hours after the reaction was begun. After several hours, the diluted dope was worked up as described in Example 28, to give 4.7 grams of slightly off-white polymer having an inherent viscosity of 1.55.

Example 30.—Preparation of poly 2,8-(phenoxathiin-10-dioxide)-2,6-naphthalene dicarbonamide

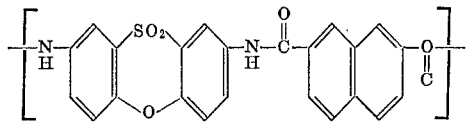

The polymerization was carried out in the usual manner, as described in Example 28, using 2.62 grams (0.010 mole) of the diamine, 40 ml. of cold 95% dimethylacetamide, 5% lithium chloride and 2.53 grams (0.010 mole) of 2,6-naphthalene dicarbonyl chloride with 3½ hours stirring at room temperature. The clear dope was treated with 1 gram of calcium carbonate, stirred for an additional hour and then heated in a water bath at 80–90° C. for 1½ hours. After cooling and diluting the dope with 40 ml. of dimethylacetamide, it was worked up in the manner described in Example 28. The yield of slightly off-white material having an inherent viscosity of 1.81 was 4.3 grams.

The bridged biphenyl polymers of this invention combine a high degree of thermal stability with solubility and flexibility. This unusual combination of properties renders these polymers particularly useful in the form of fibers, filaments and films for various high performance applications. The polymers of this invention containing bridging groups with no substituents on the aromatic rings and no groups between the rings other than the bridging groups are substantially more soluble than biphenyl containing polymers without any loss of thermal stability. The substitution of carboxyl or other groups on the benzene rings further enhances solubility and the insertion of groups between the rings improves flexibility. In fiber form the polymers may be used for high temperature electric insulation, protective clothing, filtration media and the like. In the form of films they are suitable for electric insulation, coatings, containers, laminated structures and other related uses.

The foregoing detailed description has been given for clearness of understanding only, and unnecessary limitations are not to be construed therefrom. The invention is not to be limited to the exact details shown and described since obvious modifications will occur to those skilled in the art, and any departure from the description herein that conforms to the present invention is intended to be included within the scope of the claims.

We claim:
1. An aromatic film-forming polyamide containing bridged para-biphenylene linkages and composed of regularly recurring structural units of the formula

{NH—Z—NHCO—Z'—CO} wherein Z and Z' are aromatic hydrocarbons of 6 to about 15 carbon atoms or a bridged biphenylene radical of the formula

where X is a valence bond, NHCO, $SO_2$, O, $CH_2$ or CO, Y is NHCO, $SO_2$, O, $CH_2$ or CO and R is hydrogen or COOR' where R' is hydrogen or lower alkyl, provided that at least one bridged biphenylene radical is present in each recurring unit.

2. The polyamide of claim 1 wherein Z' is

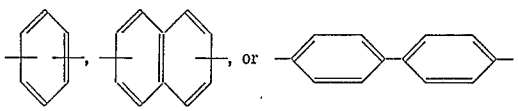

and Z is

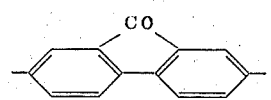

3. The polyamide of claim 1 wherein Z' is

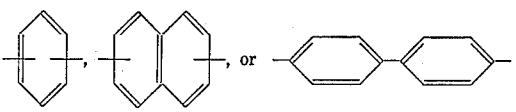

and Z is

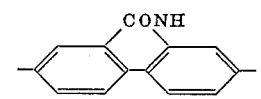

4. The polyamide of claim 1 where Z is

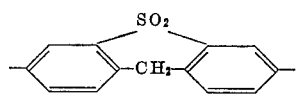

and Z' is

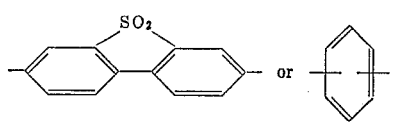

5. The polyamide of claim 1 wherein Z is

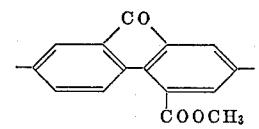

and Z' is

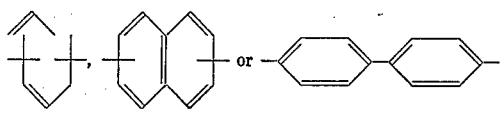

6. The polyamide of claim 1 wherein Z is

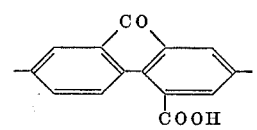

and Z' is

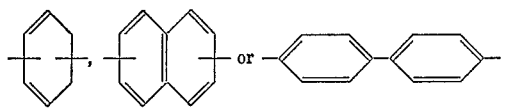

7. The polyamide of claim 1 wherein Z is

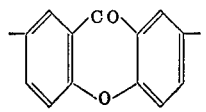

and Z' is

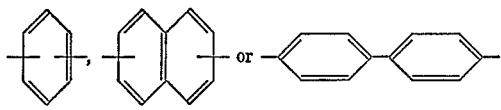

8. The polyamide of claim 1 wherein Z is

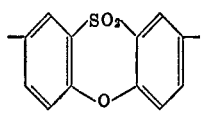

and Z' is

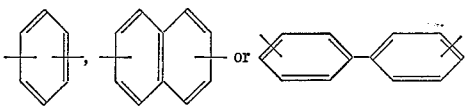

9. An aromatic film-forming polyamide composed of regularly recurring structural units of the formula

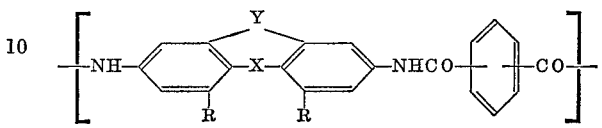

wherein X is a valence bond, $NHCO$, $SO_2$, $O$, $CH_2$, or $CO$, Y is $NHCO$, $SO_2$, $O$, $CH_2$ or $Cl$ and R is hydrogen or $COOR'$ where $R'$ is hydrogen or lower alkyl.

10. The polyamide of claim 1 in the form of a fiber.

References Cited

UNITED STATES PATENTS 3,376,258  4/1968  Gysling et al. _____ 260—47

WILLIAM H. SHORT, Primary Examiner

U.S. Cl. X.R.

117—161; 260—32.6, 32.8, 49, 65, 78, 249.7, 327, 329.3, 345.3, 471, 517, 570